United States Patent [19]

Sakano et al.

[11] Patent Number: 4,498,311
[45] Date of Patent: Feb. 12, 1985

[54] CONTROL DEVICE FOR A VARIABLE DISPLACEMENT COMPRESSOR IN AN AIR CONDITIONING SYSTEM

[75] Inventors: Riichi Sakano, Saitama; Tadayoshi Ubakata, Gunma, both of Japan

[73] Assignee: Sanden Corporation, Gunma, Japan

[21] Appl. No.: 472,497

[22] Filed: Mar. 7, 1983

[30] Foreign Application Priority Data

Mar. 5, 1982 [JP] Japan ............................ 57-30423[U]

[51] Int. Cl.$^3$ .............................................. F25B 1/00
[52] U.S. Cl. ...................................... 62/227; 62/228.5
[58] Field of Search ................. 62/228.4, 228.5, 196.2, 62/176.3, 510, 226, 227, 229, 230, 133, 323.4; 236/1 EA

[56] References Cited

U.S. PATENT DOCUMENTS

| | | | |
|---|---|---|---|
| 3,360,952 | 1/1968 | Lewis | 62/196.2 |
| 3,664,148 | 5/1972 | Yonezu | 62/230 X |
| 4,356,705 | 11/1982 | Sutoh et al. | 62/229 |
| 4,395,203 | 7/1983 | Takada | 417/441 X |

Primary Examiner—Harry B. Tanner
Attorney, Agent, or Firm—Banner, Birch, McKie & Beckett

[57] ABSTRACT

A control device is disclosed for controlling the operation of a variable displacement compressor in an air conditioning or refrigerating system. The compressor includes a variable displacement device for changing the cooling capacity of the compressor and a magnetic clutch which operates the compressor in response to an external drive mechanism. The control device controls the operation of the magnetic clutch in response to a comparison of the temperature of the cool air generated by the evaporator of the air conditioning system and a first predetermined temperature. When the temperature is above the first predetermined temperature, the compressor is operated to lower the temperature. The control device also controls the operation of the variable displacement device in the compressor. The control device operates to increase the cooling capacity of the compressor in response to a comparison of the temperature of the cool air with a second predetermined temperature. A temperature of the cool air higher than the second predetermined temperature indicates that the cooling capacity of the compressor is insufficient to satisfy the required cooling load and cooling capacity is increased. The control operates to decrease the cooling capacity of the compressor in response to a comparison of the rate of operation of the compressor with a predetermined ideal rate of operation. As a result, the compressor operates at the minimum cooling capacity required to satisfy the cooling load.

13 Claims, 8 Drawing Figures

CONTROL DEVICE FOR A VARIABLE DISPLACEMENT COMPRESSOR IN AN AIR CONDITIONING SYSTEM

BACKGROUND OF THE INVENTION

This invention relates generally to a device for controlling the operation of an air conditioning system, and more particularly, to an electronic control circuit for a variable displacement compressor in an automobile air conditioning system.

In conventional air conditioning systems known in the prior art, the air conditioning compressor is driven by a motor, either directly or through a magnetic clutch. Thermal control in the room or compartment is accomplished by the intermittent operation of the magnetic clutch or motor by a signal from a thermostat disposed in the room. Once the temperature in the room is lowered to the desired level, the supplemental cooling capacity of the air conditioner need not be as large for maintaining the desired temperature in the room. Therefore, after the room has been cooled to the desired temperature, conventional air conditioning compressors are intermittently operated in response to the thermostat signal. Compressors having large cooling capacities are operated even more intermittently because of the high amounts of energy required to drive such compressors.

In an air conditioning system for automobiles, the compressor is usually driven by the automobile engine. Because the r.p.m. of the automobile engine changes continuously, the rotation frequency of the compressor changes accordingly, resulting in rapid changes in the cooling capacity of the air conditioner. Automobile air conditioners are generally designed so that when the compressor is driven by the engine at normal driving speeds, the air conditioner operates at optimum capacity. Therefore, when the compressor is driven by the engine at lower operating speeds, or when the engine is idling, the cooling capacity of the air conditioner is insufficient to maintain adequate cooling of the vehicle. Conversely, when the compressor is driven at high operating speeds by the engine, cooling capacity is more than necessary.

One known device for controlling the excessive cooling capacity of air conditioning systems operates by reheating some of the cooled air generated by the air conditioner. Part of the air from the evaporator of the air conditioner is reheated in a heating unit. The reheated air is mixed with the remaining cooled air to control the temperature of the air which is ultimately blown into the room or compartment. In this device, the ratio of cooling capacity to heating capacity is controlled in response to the r.p.m. of the automobile engine. The above-described device for controlling air temperature is complicated and considerable energy is wasted in reheating the cooled air.

In another known device for controlling the cooling capacity of an air conditioning system, the magnetic clutch connecting the compressor to the driving engine or motor is intermittently operated to control the operation of the compressor. However, because the magnetic clutch is often required to engage the driving engine at high operating speeds, sudden and deleterious forces are generated at the moment the clutch is engaged and are transmitted to the engine and compressor. The temperature of the air which is blown into the room or compartment also drastically changes upon engagement of the clutch and operation of the compressor.

Referring to FIG. 1, there is shown a graph of the temperature variations of the air blown by a conventional air conditioning system. When the air conditioning system is first turned on and the compressor begins to operate, air having relatively high temperature Tth is blown into the room or compartment. As the compressor continues to operate, temperature Tth gradually falls to predetermined temperature $T_2$. At this point, the compressor stops operating and temperature Tth begins to rise. When temperature Tth reaches predetermined temperature $T_1$, the compressor begins operating again. Intermittent operation of the compressor continues as described above so that the temperature of the blown air is kept within the range $T_1$-$T_2$, as shown in FIG. 1.

The rate of operation $K_0$ of the compressor required to maintain the temperature of the blown air within the range $T_1$-$T_2$ may be determined by the equation $K_0 = t_1/(t_1 + t_2)$, where $K_0$ is the rate of operation of the compressor, $t_1$ is the length of time that the compressor is in an operating state and $t_2$ is the length of time that the compressor is in a non-operating state. When the rate of operation of the compressor is less than 1, the refrigerating or cooling capacity of the compressor is in excess of what is actually required by the cooling load, i.e., in excess of what is required to maintain the temperature of the blown air within the range $T_1$-$T_2$. Thus, a large amount of energy is wasted in generating cooling capacity that is not needed. Contrarily, when $K_0$ is close to 1, the compressor is operated at maximum efficiency to satisfy the required cooling load and little energy is wasted.

SUMMARY OF THE INVENTION

It is a primary object of this invention to provide a control circuit for an air conditioning system, particularly an automobile air conditioner, which controls the refrigerating capacity of the air conditioner in response to operating conditions to maintain the correct balance between refrigerating capacity and refrigeration load.

It is another object of this invention to provide a control circuit for an air conditioning system, particularly an automobile air conditioner, which reduces sudden forces acting on the engine and the compressor.

It is a further object of this invention to provide a control circuit for an air conditioning system, particularly an automobile air conditioner, which improves the performance and efficiency of the air conditioning system.

The present invention is directed to a control circuit for a compressor in a refrigerating or air conditioning system. The compressor includes a variable displacement device for changing the cooling capacity of the compressor and a magnetic clutch which operates to couple the compressor to an external drive mechanism. The control circuit includes a cooling capacity control circuit which controls the operation of the variable displacement device and a magnetic clutch control circuit which controls the operation of the magnetic clutch. The cooling capacity control circuit operates to reduce the cooling capacity of the compressor in response to a comparison of the rate of operation of the compressor with a predetermined rate of operation of the compressor. For example, when the rate of operation of the compressor is below the predetermined rate, the cooling capacity is reduced to a more efficient and economical level. The cooling capacity control circuit also operates to increase the cooling capacity of the compressor in response to a comparison of the temperature of the blown air Tth with a predetermined temperature. Accordingly, when the cooling capacity of the compressor is insufficient to satisfy the required cooling load, as indicated by a rise in temperature, cooling capacity is increased. The control circuit of this invention also includes a magnetic clutch control circuit which controls the operation of the magnetic clutch in response to a comparison of the blown air Tth with another predetermined temperature. When temperature Tth reaches the predetermined temperature, the room or compartment is at the desired temperature and the compressor may be turned off. Therefore, by turning the compressor on and off and by varying the cooling capacity, the control device of the present invention adjusts the rate of operation of the compressor to achieve optimum operating efficiency. Thus, the control device of the present invention permits an air conditioning system to be operated in a very economical and efficient manner.

Further objects, features and aspects of this invention will be understood from the following detailed description of the preferred embodiment of this invention referring to the annexed drawings.

DETAILED DESCRIPTION OF THE PREFERRED EMBODIMENT

Figure 2:
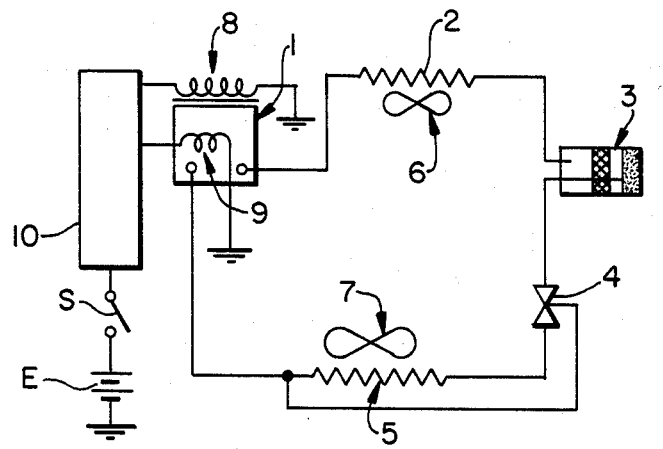
FIG. 2 is a schematic diagram of an air conditioning system including a refrigerant circuit and a control device in accordance with the present invention.

Referring to FIG. 2, the basic construction of a refrigeration or air conditioning system, particularly an automobile air conditioning system, is diagrammatically shown. The air conditioning system comprises a compressor as generally indicated by reference number 1. Compressor 1 includes magnetic clutch 8 and variable displacement device 9 which are controlled by control circuit 10, as will be explained in greater detail below. The air conditioning system shown in FIG. 2 further comprises condenser 2 and its associated fan 6, receiver and dryer 3, thermostatic expansion device or valve 4 and evaporator 5 and its associated fan 7. These basic components are coupled in series to form a conventional refrigeration circuit. Refrigerant gas is compressed in compressor 1 and supplied to condenser 2 where it is condensed to liquid refrigerant and cooled by the forced ventilation of fan 6. The liquid refrigerant is accumulated in receiver and dryer 3, which removes the moisture and metal chips from the liquid refrigerant. The liquid refrigerant within the receiver and dryer 3 is delivered to thermostatic expansion value 4. The refrigerant expands as it flows through valve 4 and emerges as a two-part mixture of liquid and gas, but primarily liquid. As the mixture flows through evaporator 5, which acts as a heat exchanger in conjunction with fan 7 which supplies air to the vehicle compartment, heat is transferred from the incoming air to the refrigerant and the entirety of the refrigerant vaporizes to a gaseous state. The refrigerant gas at the evaporator outlet is then passed to the suction inlet of compressor 1.

In the preferred embodiment, compressor 1 is a scroll-type compressor including variable displacement device 9 as shown in co-pending patent application Ser. No. 356,648, filed Mar. 9, 1982 U.S. Pat. No. 4,468,178, and co-pending patent application Ser. No. 448,490, filed on Dec. 10, 1982. Compressor 1 is controlled by the operation of magnetic clutch 8 which controls engagement of the driving means and by the operation of variable displacement device 9 which changes the cooling capacity of the compressor. Magnetic clutch 8 and variable displacement device 9 are controlled by the operation of control circuit 10, which is described in further detail below in connection with FIG. 4.

Figure 1:
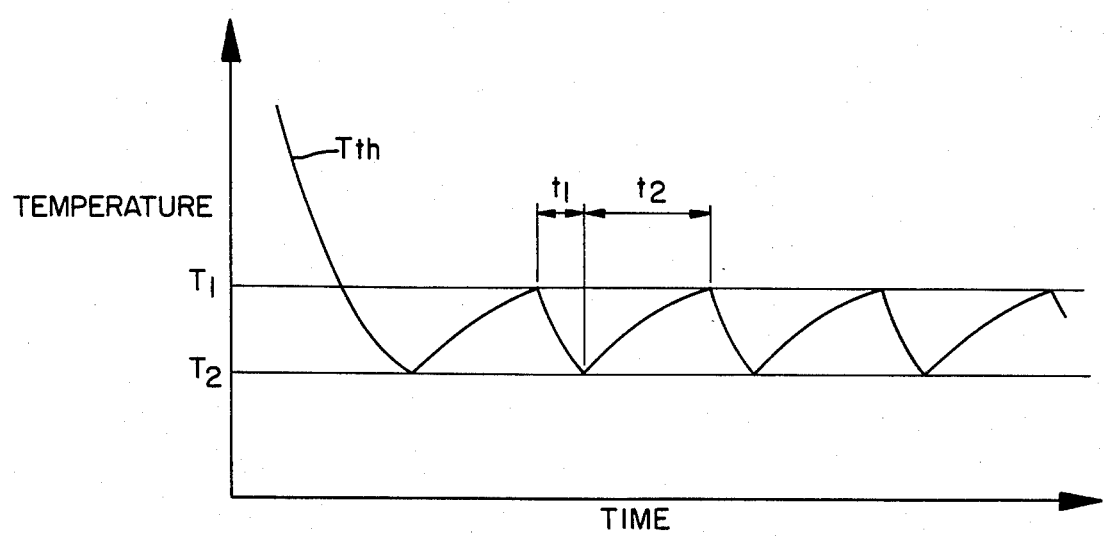
FIG. 1 is a graph illustrating the variations in temperature of the air generated by air conditioning systems known in the prior art.
Figure 3:
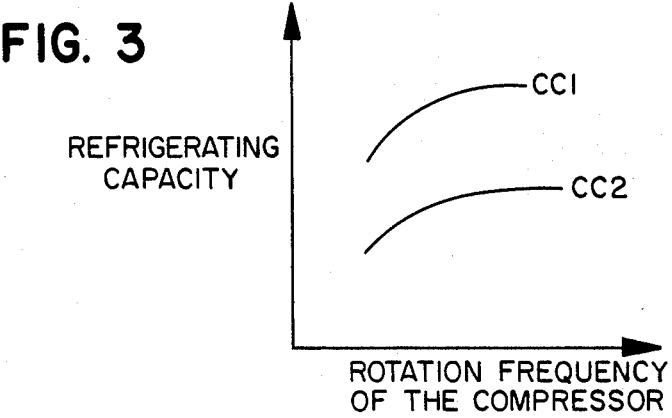
FIG. 3 is a graph of the refrigerating or cooling capacities of a variable displacement compressor of the type used in the refrigerant circuit of FIG. 2.

As mentioned above, compressor 1 includes variable displacement device 9 which is capable of changing the cooling capacity of the compressor. The cooling capacity of the compressor shown in FIG. 1 can be changed to one of two levels; i.e., CC1 or CC2, as shown in FIG. 3. Variable displcement device 9 of compressor 1 includes at least one valve as shown in patent application Ser. Nos. 356,648 and 448,490. This value is controlled by a solenoid which is in turn controlled by control circuit 10 as will be explained with reference to FIG. 4.

Figure 4:
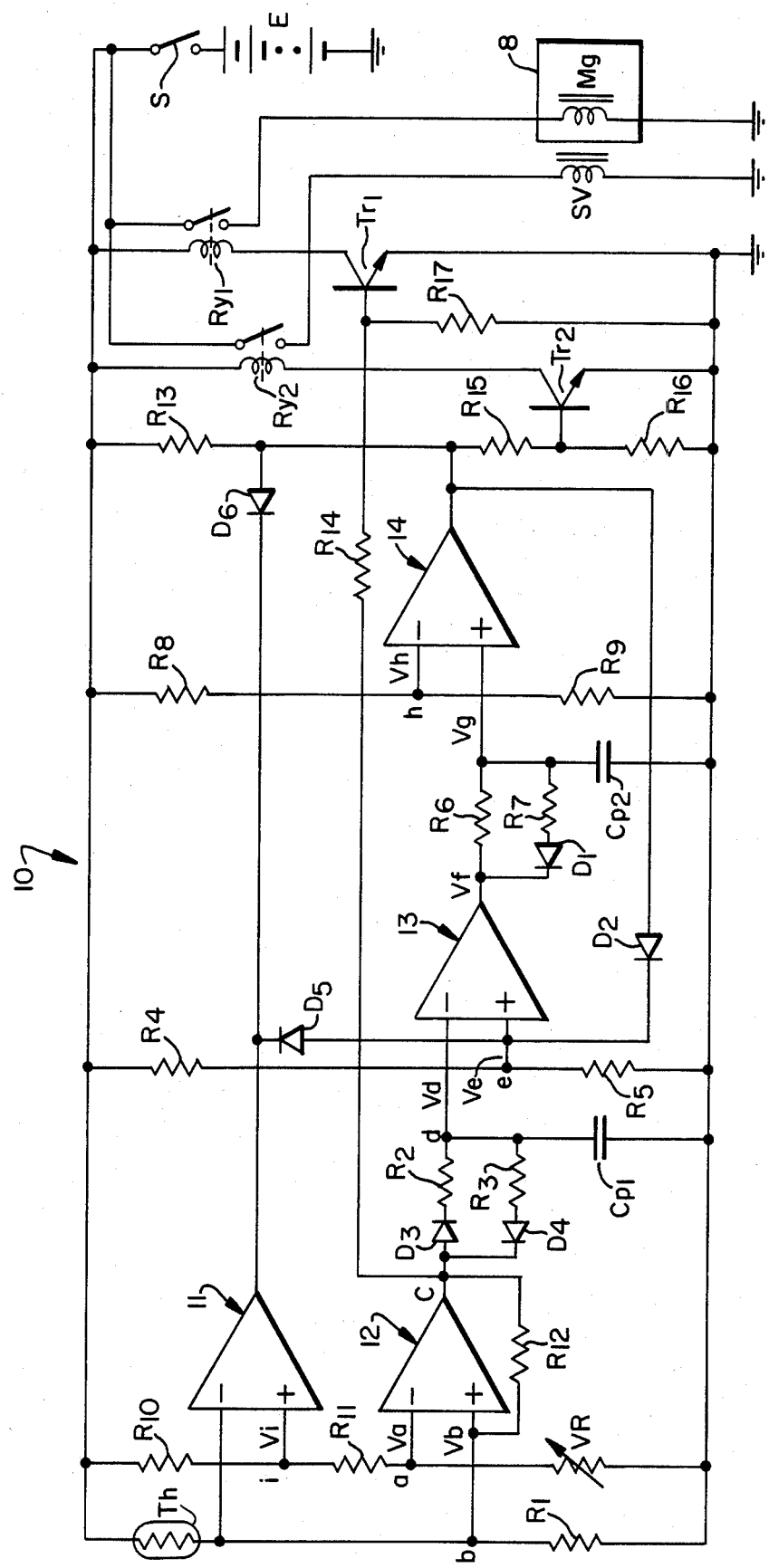
FIG. 4 is a circuit diagram illustrating one embodiment of a control circuit for the compressor of FIG. 2 in accordance with the present invention.

Referring to FIG. 4, a circuit diagram of control circuit 10 for controlling the operation of compressor 1 is shown. Control circuit 10 comprises a magnetic clutch control circuit, a cooling capacity control circuit and power supply E which supplies electrical power through switch S to control circuit 10 and to magnetic clutch 8 and variable displacement device 9 as shown.

The magnetic clutch control circuit includes an input circuit formed by voltage comparator 12 with its associated resistor $R_{12}$ and a voltage divider network formed by thermistor TH and resistor $R_1$. The voltage divider network supplies voltage Vb to the non-inverting input terminal (+) of comparator 12. Thermistor Th is mounted on the surface of the cool air outlet of evaporator 5 for sensing the temperature of the air blown from evaporator 5.

Voltage Vb at point b of control circuit 10 varies in accordance with the temperature of the air blown from evaporator 5. Accordingly, voltage Vb represents the temperature of the air at evaporator 5 and is directly proportional to such temperature. Voltage Vb is compared with reference voltage Va by comparator 12. Reference voltage Va is connected to the inverting input terminal (−) of comparator 12 and is generated by another voltage divider formed by variable resistor VR and resistors $R_{10}$ and $R_{11}$. Reference voltage Va can be changed by varying the resistance of variable resistor VR to establish a predetermined temperature $T_2$.

The output of comparator 12 is coupled to the base of NPN switching transistor $Tr_1$ for controlling the operation of magnetic clutch 8. Transistor $Tr_1$ is biased by biasing resistors $R_{14}$ and $R_{17}$. The oil of relay $Ry_1$ is connected in series with the collector/emitter circuit of transistor $Tr_1$ between power supply E and ground. The contacts of relay $Ry_1$ are connected in series with coil Mg of electromagnetic clutch 8 between power supply E and ground. When transistor $Tr_1$ conducts, the contacts of $Ry_1$ close so that electromagnetic coil Mg of clutch 8 is energized by power supply E for operating compressor 1. Thus, the primary elements of the magnetic clutch control circuit are thermistor Th, comparator 12, switching transistor $Tr_1$, relay $Ry_1$ and magnetic clutch coil Mg.

The operation of the magnetic clutch control circuit will now be described. When temperature Tth of the air blown by evaporator 5 is higher than predetermined temperature $T_2$, temperature voltage signal Vb is higher than reference voltage Va and the output of comparator 12 is high. Thus, transistor $Tr_1$ is in a conductive state and relay $Ry_1$ is energized which in turn operates magnetic clutch 8. When temperature Tth of the air blown by evaporator 5 is lower than predetermined temperature $T_2$, the output voltage level of comparator 12 is low because temperature voltage Vb is lower than reference voltage Va. Transistor $Tr_1$ then is in a nonconductive state and relay $Ry_1$ and magnetic clutch 8 are not energized.

Feed back resistor $R_{12}$ is also connected to comparator 12 to provided a hysteresis effect at the output of comparator 12. Thus, when temperature voltage Vb decreases from a level higher than reference voltage Va, corresponding to a decrease in temperature Tth, the output of comparator 12 changes from a high level to a low level when temperature voltage Vb equal reference voltage Va. However, when temperature voltage Vb increases from a level equal to reference voltage Va, corresponding to an increase in temperature Tth, the output of comparator 12 does not change from a low level to a high level until temperature voltage Vb is higher than reference voltage Va by an amount determined by the resistance of resistor $R_{12}$. Thus, predetermined temperature $T_1$ may be established.

Compressor control circuit 10 also includes circuits for reducing and increasing the cooling capacity of compressor 1. The circuit for reducing the cooling capacity of compressor 1 includes comparator 13 which is coupled to the output of comparator 12 via diodes $D_3$, $D_4$, resistors $R_2$, $R_3$ and capacitor $C_{p1}$. The output of comparator 13 is coupled to the non-inverting terminal (+) of comparator 14 via a filtering circuit formed by resistors $R_6$, $R_7$, diode $D_1$ and capacitor $C_{p2}$. Also included are reference voltage divider networks $R_4/R_5$ for comparator 13 and $R_8/R_9$ for comparator 14. The output of comparator 14 is coupled to the base of NPN switching transistor $Tr_2$ for controlling the operation of at least one valve in variable displacement device 9 in compressor 1 as shown in FIG. 2. The coil of relay $Ry_2$ is connected in series with the collector/emitter circuit of transistor $Tr_2$ between power supply E and ground. The contacts of relay $Ry_2$ are connected in series with solenoid valve SV of variable displacement device 9 between power supply E and ground. Transistor $Tr_2$ is biased by resistors $R_{13}$, $R_{15}$ and $R_{16}$. When transistor $Tr_2$ is in a conductive state, the contacts of relay $Ry_2$ are closed so that solenoid valve SV is energized and the cooling capacity of compressor 1 is changed from a large volume $CC_1$ to a small volume $CC_2$.

The operation of the circuit for reducing the cooling capacity of compressor 1 will now be described. When temperature Tth of the air blown by evaporator 5 is higher than predetermined temperature $T_2$ (compressor 1 is operating), the voltage level of the output of comparator 12 is high because temperature voltage Vb is higher than reference voltage Va. In this situation, capacitor $C_{p1}$ is charged by the output voltage of comparator 12 via diode $D_3$ and resistor $R_2$. When temperature Tth of the air blown by evaporator 5 is lower than predetermined temperature $T_2$ (compressor 1 is not operating), the voltage level of the output of comparator 12 is changed to a low level because temperature voltage Vb is lower than reference voltage Va. In this situation, capacitor $C_{p1}$ is discharged via resistor $R_3$ and diode $D_4$. Voltage level Vd at terminal d of capacitor $C_{p1}$ is thus determined by the respective lengths of time that compressor 1 is in an operating and a non-operating state. This relationship corresponds to the rate of operation Ko of compressor 1.

Figure 5:
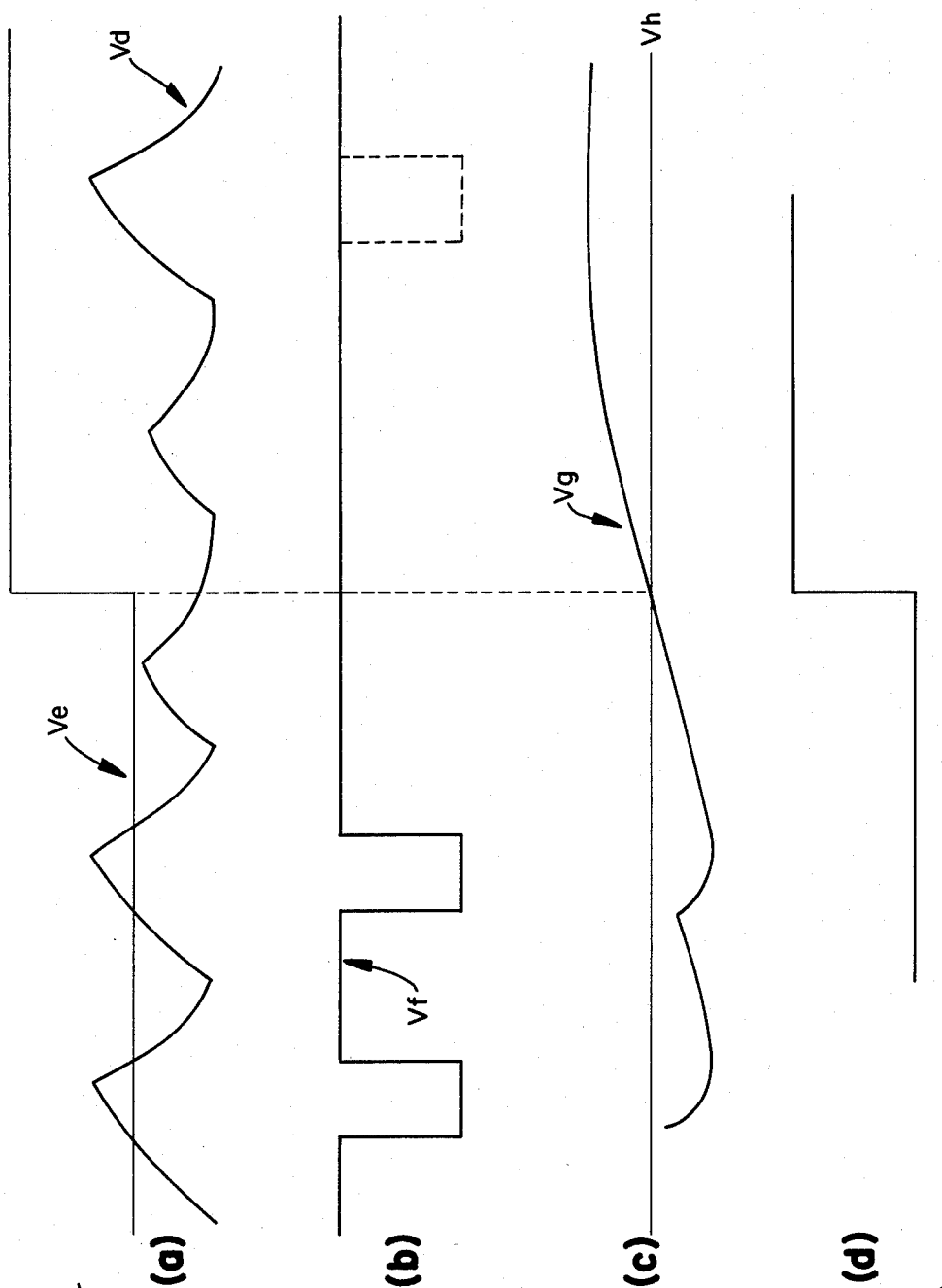
FIGS. 5a–5d graphically illustrate the voltage level changes over time at several points in the control circuit of FIG. 4.

Voltage Vd is supplied to the inverting input terminal (−) of comparator 13. Voltage Vd is compared by comparator 13 with reference voltage Ve which is generated by voltage divider network $R_4/R_5$ at the non-inverting input terminal (+) of comparator 13. If the level of voltage Vd changes as shown in FIG. 5a, output voltage Vf of comparator 13 will represent a negative going square wave having a period corresponding to the length of time that voltage Vd is higher than reference voltage Ve, as shown in FIG. 5b. Reference voltage Ve is set to establish a predetermined rate of operation K of compressor 1. Thus, if the rate of operation Ko of compressor 1 is higher than predetermined rate of operation K; i.e., voltage Vd is higher than reference voltage Ve, output voltage Vf of comparator 13 is at a low level. If the rate of operation Ko of compressor 1 is lower than predetermined rate of operation K; i.e., voltage Vd is lower than reference voltage Ve, output voltage Vf of comparator 13 is at a high level. Thus, the rate of operation Ko of compressor 1, as compared to a predetermined rate, corresponds to the changes in output voltage level Vf of comparator 13.

Voltage Vf is filtered by the filtering circuit formed by resistors $R_6$, $R_7$, diode $D_1$ and capacitor $C_{p2}$. Output voltage Vg of the filtering circuit is illustrated by FIG. 5c. The resistance of resistor $R_6$ is higher than the resistance of resistor $R_7$, therefore, the fatime of voltage Vg is very fast while the rise time is somewhat slower as shown. The filtering circuit supples voltage Vg to the non-inverting input terminal (+) of comparator 14. Voltage Vg is compared by comparator 14 to reference Vh which is generated by voltage divider network $R_8/R_9$ and is supplied to the inverting input terminal (−) of comparator 14.

The operation of comparator 14 will now be described. When the rate of operation Ko of compressor 1 is higher than the predetermined rate of operation K of compressor 1, output voltage Vf of comparator 13 changes to a low level as shown in Figure b (voltage Vd higher than reference voltage Ve). In this situation, voltage Vg is usually lower than reference voltage Vh. The output voltage of comparator 14 is therefore low. Transistor $Tr_2$ is accordingly in a non-conductive state and relay $Ry_2$ and solenoid valve SV are de-energized. The compressor is thus operated with large volume $CC_1$.

When rate of operation Ko of compressor 1 is lower than predetermined rate of operation K, output voltage Vf of comparator 13 changes to a high level, as shown in FIG. 5b (voltage Vd less than reference voltage Ve). In this situation, voltage Vg is allowed to increase and the output voltage of comparator 14 is changed to a high voltage level when voltage Vg reaches reference voltage Vh as shown by FIG. 5d. When this occurs, transistor $Tr_2$ is rendered conductive and relay $Ry_2$ and solenoid valve SV are energized. Therefore, the capacity of the compressor is changed to small volume $CC_2$ from large volume $CC_1$.

The output of comparator 14 is also coupled to the non-inverting input terminal (+) of comparator 13 via diode $D_2$. Therefore, after the output voltage of comparator 14 is changed to a high level, voltage Ve of the non-inverting terminal (+) of comparator 13 is shifted up, as shown in FIG. 5a, by the output voltage level of comparator 14. The output voltage levels of comparators 13 and 14 are accordingly maintained at a high level so that compressor 1 continues to operate with small volume $CC_2$. The output of comparator 14 is also coupled to transistor $Tr_2$ back through diodes $D_5$ and $D_6$ to insure that transistor $Tr_2$ remains in a conductive state.

The circuit for increasing the capacity of compressor 1 is formed by voltage comparator 11 and the voltage divider network formed by thermistor Th and resistor $R_1$. The voltage divider network supplies voltage Vb to inverting input terminal (−) of comparator 11. Voltage Vb is the same voltage level as also supplied to a non-inverting input terminal (+) of comparator 12. Voltage Vb is compared by comparator 11 with reference voltage Vi which is generated by the voltage divider network formed by resistor $R_{10}$, $R_{11}$ and variable resistor VR. The voltage level of reference voltage Vi is higher than voltage Va which is input to the inverting terminal of comparator 12 and establishes predetermined temperature $T_1'$. Therefore, predetermined temperature $T_1'$ is slightly higher than predetermined temperature $T_1$. The output of comparator 11 is coupled to the base of transistor $Tr_2$ via diode $D_6$ and resistor $R_5$ for controlling the operation of solenoid valve SV.

If temperature Tth of the air blown by evaporator 5 is lower than predetermined temperature $T_1'$, the output voltage level of comparator 11 is high because reference voltage Vi is higher than temperature voltage Vb. When the output voltage level of comparator 11 is high, the voltage level at the base of transistor $Tr_2$ from the output of comparator 14 causes $Tr_2$ to conduct. Thus, solenoid valve SV of variable displacement device 9 is thus operated to decrease the cooling capacity of compressor 1.

If temperature Tth of the air blown by evaporator 5 is higher than predetermined temperature $T_1'$, the output voltage level of comparator 11 changes to a low level because temperature voltage signal Vb is higher than reference voltage Vi. When the output voltage of comparator 11 changes to a low level, transistor $Tr_2$ is turned off and relay $Ry_2$ and solenoid valve SV are de-energized. Therefore, the cooling capacity of compressor 1 is changed to large volume $CC_1$ from small volume $CC_2$.

In this embodiment, the rate of operation of compressor 1 is determined by the on/off time of compressor 1 which corresponds to the voltage level at terminal d of capacitor $C_{p1}$. Alternatively, the rate of operation of compressor 1 may be determined solely from the on time of compressor 1 which is detected by the charging and discharging circuit formed by diodes $D_3$, $D_4$, resistors $R_2$, $R_3$ and capacitor $C_{p1}$.

This invention has been described in detail in connection with a preferred embodiment, but the preferred embodiment is an example only and this invention is not restricted thereto. It will be easily understood by those skilled in the art that other variations and modifications can be easily made within the scope of this invention.

We claim:

1. A control device for an air conditioning system including a compressor, a condenser, a thermostatic expansion device, an evaporator and a blower to blow cool air from said evaporator, said compressor having a magnetic clutch to drive said compressor and a variable displacement device to change the cooling capacity of the air conditioning system said control device comprising:
   a voltage source;
   a magnetic clutch control means connected to said voltage source for actuating said magnetic clutch to drive said compressor; and
   cooling capacity control means connected to said voltage source for actuating said variable displacement device to change the cooling capacity of the air conditioning system in response to the rate of operation of said compressor, where the rate of operation of said compressor is determined by the respective lengths of time that said compressor is in an operating and non-operating state.

2. The control device of claim 1 wherein said magnetic clutch control means comprises temperature detecting means for detecting the temperature of the air generated by the air conditioning system and temperature evaluating means for comparing the detected temperature to a predetermined temperature, said temperature evaluating means generating a control signal for actuating said magnetic clutch when the detected temperature is above the predetermined temperature.

3. The control device of claim 2 wherein said temperature detecting means comprises a thermistor and said temperature evaluating means comprises a voltage comparator.

4. The control device of claim 1 wherein said cooling capacity control means comprises rate detecting means for detecting the rate of operation of the air conditioning system and rate evaluating means for comparing the detected rate to a predetermined rate, said rate evaluating means generating a control signal for actuating said variable displacement device to change the cooling capacity of the air conditioning system.

5. The control device of claim 1 wherein said rate detecting means comprises an R/C time constant circuit which generates a first voltage related to the rate of operation of the air conditioning system and a voltage comparator coupled to said R/C time constant circuit to compare the first voltage with a predetermined second voltage and said rate evaluating means comprises a voltage comparator.

6. A control device for an air conditioning system including a compressor, a condenser, a thermostatic expansion device, an evaporator and a blower to blow cool air from said evaporator, said compressor having a magnetic clutch to drive said compressor and a variable displacement device to change the cooling capacity of the air conditioning system, said control device comprising:
   a voltage source;
   magnetic clutch control means connected to said voltage source for actuating said magnetic clutch to drive said compressor; and
   cooling capacity control means connected to said voltage source for actuating said variable displacement device to change the cooling capacity of the air conditioning system in response to the rate of operation of said compressor, said cooling capacity control means including rate detecting means for detecting the rate of operation of the air conditioning system and rate evaluating means for comparing the detected rate to a predetermined rate, said rate evaluating means generating a control signal for actuating said variable displacement device to change the cooling capacity of the air conditioning system, the control signal actuating said variable displacement device to decrease the cooling capacity of the air conditioning system when the detected rate of operation of said compressor is less than the predetermined rate.

7. A control device for an air conditioning system including a compressor, a condenser, a thermostatic expansion device, an evaporator and a blower to blow cool air from said evaporator, said compressor having a magnetic clutch to drive said compressor and a variable displacement device to change the cooling capacity of the air conditioning system, said control device comprising:
a voltage source;
magnetic clutch control means connected to said voltage source for actuating said magnetic clutch to drive said compressor; and
cooling capacity control means connected to said voltage source for actuating said variable displacement device to change the cooling capacity of the air conditioning system in response to the rate of operation of said compressor, said cooling capacity control means including rate detecting means for detecting the rate of operation of the air conditioning system and rate evaluating means for comparing the detected rate to a predetermined rate, said rate evaluating means generating a control signal for actuating said variable displacement device to change the cooling capacity of the air conditioning system, said cooling capacity control means further including temperature detecting means for detecting the temperature of the air generated by the air conditioning system and temperature evaluating means for comparing the detected temperature to a predetermined temperature, said temperature evaluating means generating a control signal to increase the cooling capacity of the air conditioning system when the detected temperature is above the predetermined temperature.

8. The control device of claim 7 wherein said temperature detecting means comprises a thermistor and said temperature evaluating means comprises a voltage comparator.

9. The control device of claim 6 wherein the rate of operation of said compressor is determined from the operation time of said compressor.

10. The control device of claim 6 wherein the rate of operation of said compressor is determined from the operating and non-operating times of said compressor.

11. A control device for a compressor in an air conditioning system, said compressor having a magnetic clutch to drive said compressor and a variable displacement device to change the cooling capacity of said compressor between a small and a large volume, said control device comprising:
a voltage source;
magnetic clutch control means connected to said voltage source for actuating said magnetic clutch to drive said compressor, said magnetic clutch control means including a thermistor for sensing the temperature of the air blown by the air conditioning system and a first comparator for comparing the sensed temperature to a first predetermined temperature, said first comparator generating a control signal for actuating said magnetic clutch when the sensed temperature is above the first predetermined temperature;
first cooling capacity control circuit means connected to said voltage source for actuating said variable displacement device to decrease the cooling capacity of said compressor, said first cooling capacity control means including a second comparator operatively connected to said first comparator for determining the rate of operation of said compressor and a third comparator operatively connected to said second comparator for comparing the determined rate of operation of said compressor to a predetermined rate, said third comparator generating a control signal to actuate said variable displacement device to decrease the cooling capacity of said compressor when the determined rate of operation of the compressor is below the predetermined rate; and
second cooling capacity control circuit means connected to said voltage source for actuating said variable displacement device to increase the cooling capacity of said compressor, said second cooling capacity control means including a fourth comparator for comparing the sensed temperature of the air blown by the air conditioning system to a second predetermined temperature, said fourth comparator generating a signal to actuate said variable displacement device to increase the cooling capacity of said compressor when the sensed temperature is above the second predetermined temperature.

12. The control device of claim 11 wherein the rate of operation of said compressor is determined from the operation time of said compressor.

13. The control device of claim 11 wherein the rate of operation of said compressor is determined from the operating said non-operating times of said compressor.

* * * * *